United States Patent [19]

De Gaudenzi et al.

[11] Patent Number: 5,327,467

[45] Date of Patent: Jul. 5, 1994

[54] CODE DISTRIBUTION MULTIPLE ACCESS COMMUNICATION SYSTEM WITH USER VOICE ACTIVATED CARRIER AND CODE SYNCHRONIZATION

[75] Inventors: Riccardo De Gaudenzi, Leiderdorp; Roberto Viola, Oegstgeest, both of Netherlands

[73] Assignee: Agence Spatiale Europeenne, Paris, France

[21] Appl. No.: 663,835

[22] PCT Filed: Jul. 31, 1990

[86] PCT No.: PCT/EP90/01276

§ 371 Date: May 30, 1991

§ 102(e) Date: May 30, 1991

[87] PCT Pub. No.: WO91/02415

PCT Pub. Date: Feb. 21, 1991

[30] Foreign Application Priority Data

Aug. 3, 1989 [FR] France ................. 89 10481

[51] Int. Cl.⁵ .............................. H04L 7/00
[52] U.S. Cl. .......................... 375/107; 370/18
[58] Field of Search ............. 375/107, 1, 108, 109, 375/115; 370/18, 100.1, 104.1

[56] References Cited

U.S. PATENT DOCUMENTS

| | | | |
|---|---|---|---|
| 4,494,228 | 1/1985 | Gutleber | 375/96 |
| 4,559,633 | 12/1985 | Kan et al. | 370/18 |
| 4,688,210 | 8/1987 | Eizenhofer et al. | 375/107 |
| 4,882,579 | 11/1989 | Siwiak | 370/18 |

FOREIGN PATENT DOCUMENTS 2259359 7/1974 Fed. Rep. of Germany .

OTHER PUBLICATIONS

Viola, et al. "Variable Rate Speech Coder Matching The Needs of Traffic Reconfigurability" Oct. 1985, Int'l. Astronautical Federation.
Jacobs, et al. "Comparison of CDMA and FDMA for the Mobilestar System", May 1988, pp. 303–308.
Atal, et al. "A New Model of LPC Excitation for Producing Natural-Sounding Speech at Low Bit Rates", 1982 Proceedings IEEE ICASP, pp. 614–617.

*Primary Examiner*—Stephen Chin
*Attorney, Agent, or Firm*—Fitzpatrick, Cella, Harper & Scinto

[57] ABSTRACT

A communication system comprising a master control station and user terminals (100), in which synchronization in the outward link is achieved by transmitting a master code (MC) with the same clock frequency and carrier as the communication signals, wherein the master code (MC) is transmitted continuously and with greater power than that of the return link signals, and wherein the user voice activated message transmission carrier is broken during the pauses in a message. The invention relates in particular to a mobile satellite communications system.

14 Claims, 3 Drawing Sheets

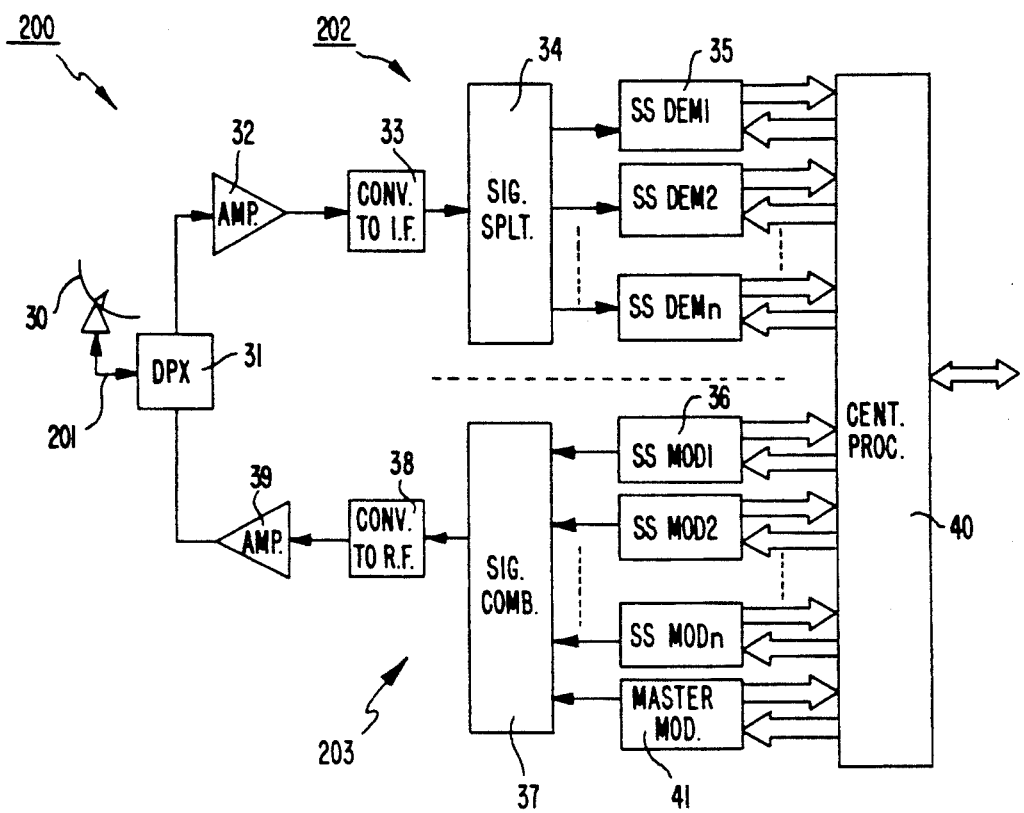
F I G. 2
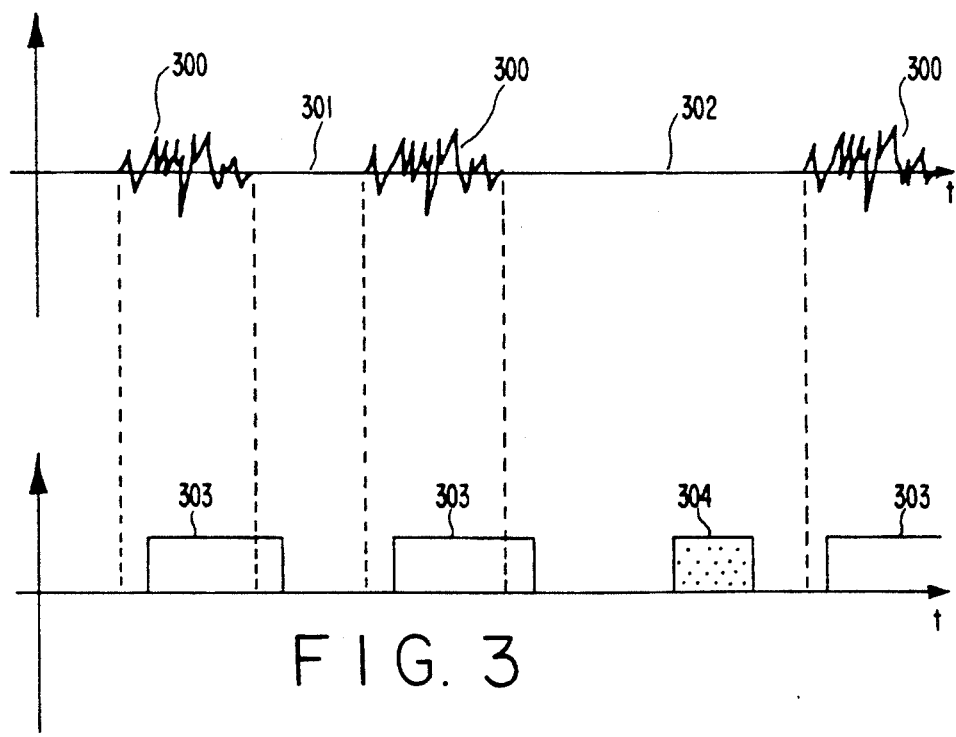
F I G. 3

CODE DISTRIBUTION MULTIPLE ACCESS COMMUNICATION SYSTEM WITH USER VOICE ACTIVATED CARRIER AND CODE SYNCHRONIZATION

The present invention relates to a code distribution multiple access communication system in which the transmission carrier is activated by the user voice.

The bandwidth available for mobile satellite services is limited so that the available number of channels for service is insufficient to absorb the traffic of the community of potential users. The major problem is the system efficiency in terms of information transmitted vs. used frequency bandwidth for a given signal-to-noise ratio.

The code distribution multiple access system while demonstrating interesting advantages, was applied heretofore to satellite mobile communication for data transmission only and this because of the long acquisition time combined with the poor spectral efficiency of the system.

It has been proposed recently to increase the communication channel efficiency of a CDMA mobile communication system by using carrier activation by the user voice, said technique resulting in reducing the average number of contemporary users and consequently reducing the interference levels between communication channels ("Comparison of CDMA and FDMA for the Mobilestar System" by I. M. Jacobs et al, Proceedings of the Mobile Satellite Conference, Pasadena, Calif., May 3-5, 1988).

Said document discusses the theoretical advantages of the proposed techniques but it does not show how the system can operate nor does it disclose any solution to operate the system in a non-continuous mode so as to maintain the spread spectrum acquisition time compatible with the real-time speech communication needs. The aforementioned document does neither suggests any solution for controlling the call blocking.

The object of the present invention is to solve said practical problems and to improve the CDMA system efficiency so as to make it possible to transmit not only data but also voice via satellite.

In accordance with the invention there is now provided a process for achieving the synchronization between a user terminal and a master control station in a code distribution multiple access communication system With a carrier activated by the user voice at the user terminal, wherein the synchronization in the forward link is achieved by transmitting a master code (MC) with the same clock frequency and the same carrier as the communication signals, the master code (MC) is transmitted uninterruptedly and with a higher power level than the return link signals, and the user voice activated carrier for the speech transmission is interrupted during speech pauses.

The user voice is compressed by a voice processor and subdivided into two data streams according to the hierarchical coding principle.

The present invention has also for an object, a code distribution multiple access satellite communication system in which each user terminal comprises a code acquisition and tracking device adapted to receive the master code and to control a code generator that is arranged to produce a local replica of the user code used for the link to be established.

The present invention solves the synchronization problems in satellite communication systems by using the technique of voice activation of the transmission carrier. The blocking probability is reduced by adopting a hierarchical coding with a minimum complexity increase on the mobile terminal. The advantage of the invention is that it solves the synchronization problems posed by the use of voice activation in a CDMA communication system and this feature is obtained with a reduced additional hardware. Thanks to the proposed solution, the invention makes it possible to operate a satellite mobile communication system with a better efficiency, a lower interference level and a better quality of service than an equivalent frequency distribution multiple access system.

The invention applies not only to a mobile communication system but also to any communication system in which the synchronization is a challenging problem. For instance, we may mention a Satellite Relay System and a Satellite Communication System using Small Fixed Terminals. In such systems, using the master code synchronization as proposed by the present invention makes it possible to considerably reduce the acquisition time of the data signal receive circuitries, thus leading to an increase in the system efficiency.

The invention is disclosed in more details hereinafter with reference to the accompanying drawings.

FIG. 2 is a block diagram of a ground master control station in accordance with the invention.

FIG. 3 is a diagram illustrating the carrier user-voice activation process in a communication terminal.

Figure 4A:
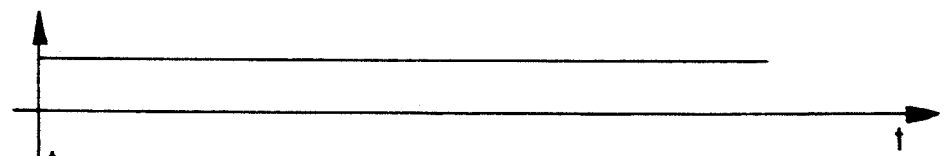
Figure 4B:
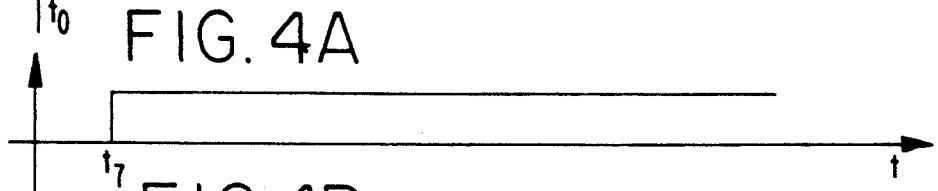
Figure 4C:
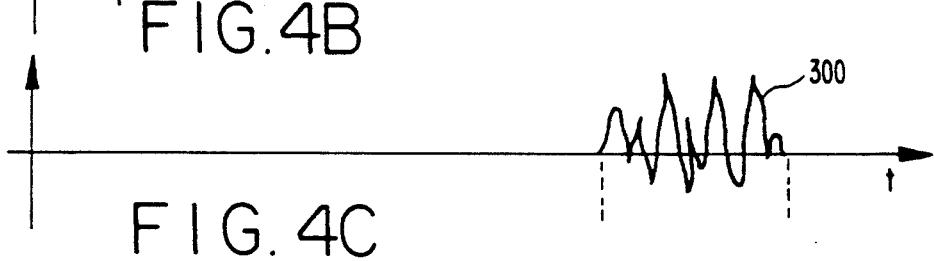
Figure 4D:
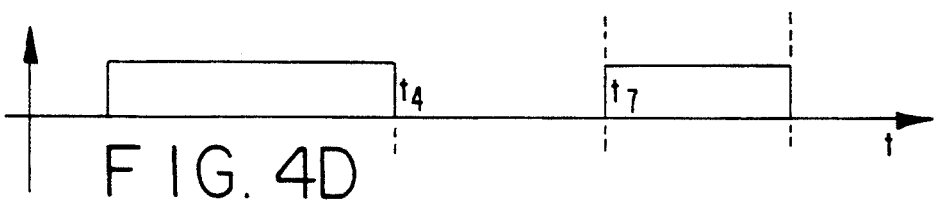
Figure 4E:
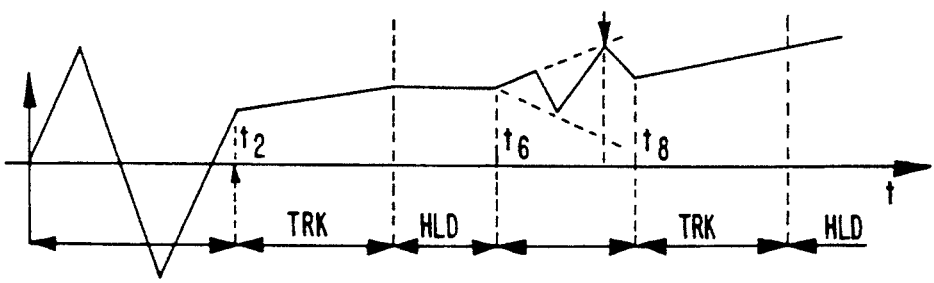
Figure 4F:
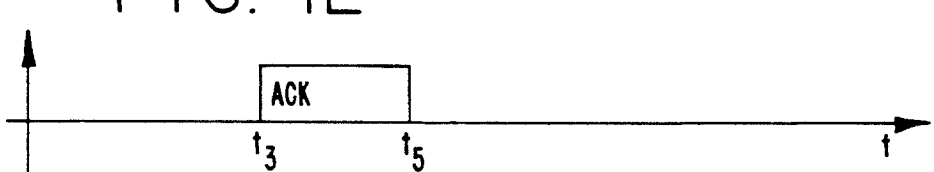
Figure 4G:
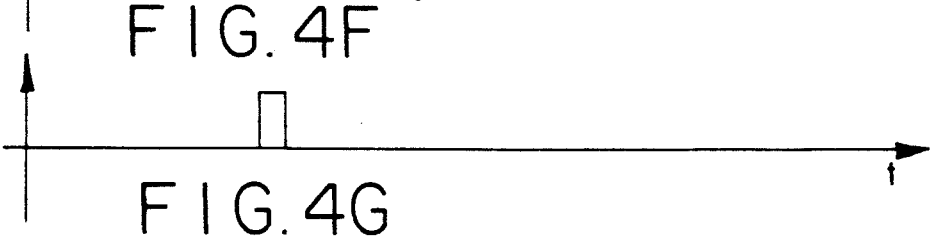

FIGS. 4A-4B diagrammatically illustrate the operation of the code acquisition and tracking process according to the invention.

GENERAL DESCRIPTION OF AN EXEMPLARY EMBODIMENT

The communication system described hereinafter for illustrating purposes is a mobile network using a transparent satellite transponder and accessing the ground network through a centralized master control station. The access system takes place by code distribution multiple access in both directions.

Each mobile communication terminal has the capability to transmit and receive compressed digital information (speech messages, data, signalling). To each terminal are assigned two user codes (PN codes): one for the I channel and one for the Q channel. Signals in the demodulator is delayed by half of the code period with respect to the in-phase channel code in order to avoid problems related to partial correlation between the I an Q channel signals in the demodulator.

Figure 1:
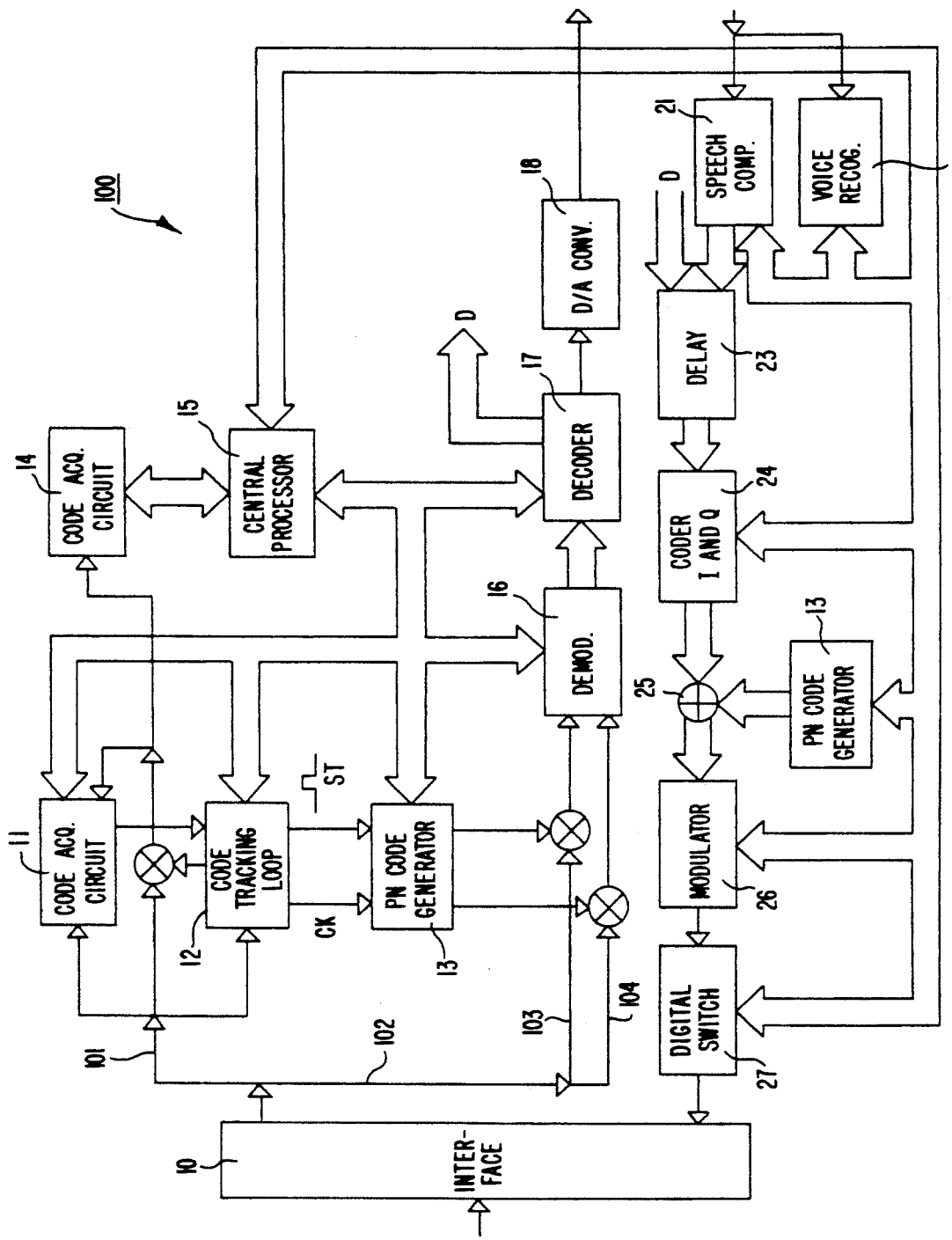
FIG. 1 is a block diagram of a communication terminal in accordance with the invention.

In each communication terminal, the signals representing the user voice are compressed by a voice processor and sub-divided into two data streams according to the hierarchical coding principle known per se (see "Variable Rate Speech Coder Matching The Needs Of Traffic Reconfigurability" by R. Viola and P. Mandarini, Proceedings of the 36th Congress of the International Astronautical Federation, Stockholm, Sweden, Oct. 7-12, 1985). In accordance with that process, a first data stream contains the basic voice parameters and the second data stream transmits data improving the voice quality. Said process has not been implemented so far in a spread spectrum system. The two coded data stream sub-division in such a system gives the master control station the possibility to reduce the blocking probability and to control the interference level by reducing the number of active codes, i.e. by allocating a single code to a specified number of users. A block diagram of a user terminal according to the invention is shown in FIG. 1. Each terminal comprises the conventional modulation and demodulation circuitries but, in accordance with one aspect of the invention, the transmission carrier is activated by the user voice, i.e. the carrier is interrupted during the speech pauses. The interference level on the link is thereby reduced.

The transmission circuitry comprises a device 21 having the task not only to compress the speech signals to be transmitted but also detect the user voice activity. A so-called hybrid vocoder is particularly suited for this task. The purpose is to enhance the voice source description with a set of parameters giving a better representation of the speech signal under examination. This technique is based on the work of B. S. Atal and J. R. Remde (A New Model For LPC Excitation For Producing Natural Sounding Speech At Low Bit Rates, Proceedings IEEE ICASP 1982, pages 614–617).

The voice frequency signals are first digitized in the vocoder 21 with the aid of the voice recognizer 22. The delay circuit 23 connected at tile output of the vocoder 21 serves to introduce an adequate delay to compensate for the delay required for voice recognition by the voice recognizer 22. The digital signal is coded in the coder 24 to produce the I and Q bit streams. These bit streams are logically added with the respective PN codes in the logic circuit 25, and then they are used in the modulator 26 for modulation of the carrier. A digital switch 27 controlled by the voice recognizer 22 interrupts the modulated signal transmission during the speech pauses. However, as will be apparent later herein, when too long a speech pause is detected, e.g. a pause longer than four seconds or so, a forced carrier activation is achieved in the modulator 26 for a time duration which should allow the master control station demodulator to be locked. The coded and modulated signals are routed to a transmission antenna through interface 10.

The receive circuitry in the user terminal 100 comprises a demodulator 16, a decoder 17 and a digital/analog converter 18, and also, in accordance with the invention, a code acquisition circuit 10–14 intended for achieving the synchronisation as described hereinafter. The overall operation of the user terminal is managed by a central processor 15.

Synchronization

The synchronisation problem related to the carrier voice activation is solved according to the invention in different ways in the forward and in the return link.

In the forward link, the master control station transmits a master code uninterruptedly to all possible communication terminals 100. The master code MC is transmitted with the same clock frequency and the same carrier frequency as the useful signal. The master code is transmitted uninterruptedly with a higher power level than the return link signals. Said master code is composed of a low data rate carrier which is spread by a code having the same length and code rate as the PN codes at the communication terminals, but substitute quasi-orthogonal to them. The message contains general network status information (e.g. the available PN codes).

FIG. 2 shows a block diagram of the master control station. The antenna 30 is coupled through a two-way line 201 to a diplexer 31 serving to separate the received signals from the transmitted signals. The receive circuitry 202 comprises an amplifier 32 followed by a converter 33 for down-conversion of the RF radiofrequency signal to IF intermediate frequency signal. The IF signal is then split in a splitter 34 for being applied to the different demodulators 35. These demodulators are different from each other only for the PN code which is tracked. The demodulated signal is routed to a central processor 40 which achieves all communication management functions.

The transmit circuitry 202 comprises several modulators 36 which distinguish from each other by using a quasi-orthogonal PN code. A master modulator 41 is intended for transmission of the master code MC. The different modulated signals are combined in a combiner 37 and then up-converted to the RF radiofrequency band by a converter 38. After amplification achieved in an amplifier 39, the RF signal is routed to the antenna 30 through the diplexer 31.

As the carrier frequency and the forward path of the master code are the same as those of the voice-activated signal, the delay and Doppler effect which affect the two signals are also the same.

For achieving the desired synchronization, the invention provides a code acquisition and tracking system in each user terminal. Said code acquisition and tracking system is now described with reference again to FIG. 1. Each terminal 100 is assumed to be continuously locked to the master code MC transmitted uninterruptedly by the master control station. The output from interface 10 is the IF intermediate frequency signal which contains the satellite-switched signals and the master code MC. The latter is routed through line 101 to the code acquisition circuit 11 and passed to the master code tracking loop 12 which derives the clock pulses CK and the start pulse ST. These CK and ST pulses are used for controlling the user code replica generator 13 which generates a synchronous replica of the user codes quasi-orthogonal PN for the I and Q communication channels. These PN codes are then used, in a manner known per se, to despread the IF signal received on lines 102, 103 and 104 prior to being applied to the demodulator 16 for binary restoration. The reconstructed bit stream is applied to the decoder 17. An output of same provides the speech signals which are applied to the digital/analog converter 18. The output of said converter delivers the voice frequency signals. Another output of decoder 17 delivers the data signals DATA.

Thanks to the master code tracking loop which is provided in the user terminal, the synchronous replica of the user codes PN is generated in the user terminal without any need for a dedicated acquisition and tracking subsystem. The same considerations apply for the carrier which is supplied to the demodulator by dedicated a Costas loop. A simple despreader and code replica generator solve this problem. Moreover, the system can be designed with a higher margin for the master code with respect to the speech signal. By this way, it will be possible to keep the user terminal in lock even in presence of severe fading conditions. The message can be partly disturbed by a deep fading, but the demodulator restoration will not be delayed anymore by the re-synchronization time. In case of traffic generated by distributed sources, the user carrier has to be separately tracked by a different Costas loop.

Unfortunately, the master code which ensures synchronization in the forward link, cannot be employed for ensuring the synchronization in the return link because of the decentralized network topology. The solution provided by the invention for the return link is based on a forced carrier activation when a long speech pause occurs, thereby to avoid too long pauses between consecutive talkspurs and thus avoid a considerable increase in the signal acquisition time at the ground master control station.

The forced carrier activation process according to the invention is illustrated in the diagram of FIG. 3. In section A there is shown three consecutive user talkspurs 300 which are spaced apart by exemplary speech pauses 301 and 302. Pause 301 is assumed to be shorter than a predefined time duration, for instance four seconds, while pause 302 is assumed to be longer than said predefined time duration. In section B, the reference numeral 303 represents the output signal from the voice recognizer 22 (FIG. 1), which signal is produced when a talkspur 300 has been detected. As set forth hereinbefore, the signals 303 activate the carrier and this activation is interrupted during the normal speech pauses (e.g. pause 301). However, when a pause exceeds a predefined time duration (for instance, four seconds in the example shown above), a forced carrier activation is achieved as soon as said predefined time duration has elapsed. Such a situation is represented by the signal 304 occurring during the pause 302. This forced activation is held for a duration which should allow the master control station demodulator to be locked. The forced carrier activation is commanded and controlled by the central processor 15 in the user terminal.

An exemplary acquisition and tracking process achieved for the return link is set forth hereinafter, with reference to FIGS. 4A–4G.

At time t0, the user terminal is assumed to be in stand-by and synchronized to the master code MC which is received in a continuous way (diagram A).

At time t1 starts the user terminal operation (diagram B) either because a call is received or because the user wants to place a call. The carrier is activated (diagram D) using one of the possible PN codes available at that time (code PNj). This code PNj is available to the user terminal by decoding the message contained in the received master code MC. At the master control station the demodulator corresponding to the code PNj is in continuous search over the complete range of expected Doppler frequencies to find the delay uncertainty.

At time t2 (diagram E) the acquisition phase of the user PN acquisition code comes to an end and the PN code tracking loop in demodulator j at the master control station declares the lock status of said demodulator for allowing the user message to be decoded at the master control station. The request for using the code PNj is then accepted. And at time t3 the master control station sends an acknowledgement ACK (diagram F) to the user terminal by activation of the forward link using the user code PNj.

This exchange of messages between the user terminal and the master control station constitutes the tracking phase TRK (diagram E). The return link carrier is de-activated at time t4 (diagram D) and consequently the forward link carrier is de-activated at time t5 (diagram F). Starting from this time, the user has a two-way link ready for voice transmission and reception (diagram G).

The PN code tracking loop will be held to the last valid delay measurement for a time duration not exceeding a prescribed hold duration HLD (diagram E) . if no signal is detected at the master control station within the prescribed time HLD (case illustrated in FIG. 4), a search process SRH is started at time t6. The search range will be linearly increased with time. The slope is computed considering the maximum incremental delay variation of the user terminal.

At time t7 a talkspur 300 is assumed to occur (diagram C), the voice recognizer 22 at the user terminal (see FIG. 1) then activates the carrier again for the return link (diagram E).

At time t8 starts a new tracking phrase TRK, whereby the master control station is locked again to demodulate the user message until the return link is switched-off during the following speech pause.

The hold-in phase HLD (diagram E) is restarted with the same sequence of events as described above. When no voice activation is detected by the voice recognizer 22 at the user terminal within the prescriber hold-in time, the user terminal processor controls a forced activation of the carrier in the return link. A synchronization pulse is then transmitted to the master control station to allow the assigned demodulator therein to keep in lock for further signal demodulation. The search, tracking and hold-in phases are recurring until the message is ended. In case of no lock after a predefined time based on the forced activation time-out, the demodulator in the master control station will consider the conversation terminated and the central processor 40 in the master control station will inform that the code PNj is again available to another user and allows a new search process to be started.

The embodiment of the invention as described in the foregoing is an example given for illustrative purposes and the invention is not limited thereto. Any modification, variation and equivalent arrangement should be considered to be within the scope of the invention.

We claim:

1. A process for achieving the synchronization between a user terminal and a master control station in a Code Distribution Multiple Access (CMDA) communication system comprising a plurality of user terminals and a centralized master control station, each user terminal and the master control station being adapted to transmit and receive communication signals over a two-way forward/return link, said user terminal being adapted to transmit voice activated carrier signals, said processing comprising the steps of:

achieving the synchronization in the forward link by using a master code transmitted uninterruptedly from the master control station, said master code having a higher power level than the return link signals, said master code serving to synchronize the user terminal to the master control station for demodulation of the communication signals; and achieving the synchronization in the return link by using a synchronization signal transmitted form the user terminal during the pauses in a message when a pause has a duration longer than a predetermined time, said synchronization signal having a duration which should allow the master control station to be locked for further signal demodulation.

2. A process according to claim 1, wherein the master code is transmitted with the same carrier as the communication signals.

3. A process according to claim 1, wherein the master code from the master control station is acquired and tracked in the user terminal for decoding of same and generating the user code to be used in achieving the signal demodulation.

4. A process according to claim 3, wherein the user code used for transmission from the user terminal is acquired and tracked in the master control station for locking the circuitry therein to achieve the signal demodulation.

5. A process according to claim 1, wherein the user voice is compressed and sub-divided into two data streams in accordance with the hierarchical method.

6. A process according to claim 2, wherein the user voice is compressed and sub-divided into two data streams in accordance with the hierarchical method.

7. A process according to claim 3, wherein the user voice is compressed and sub-divided into two data streams in accordance with the hierarchical method.

8. A process according to claim 4, wherein the user voice is compressed and sub-divided into two data streams in accordance with the hierarchical method.

9. A Code Distribution Multiple Access (CDMA) satellite communication system, comprising a plurality of user terminals and a centralized master control station, each user terminal and the master control station being adapted to transmit and receive communication signals over a two-way forward/return link;

the master control station further comprising means for transmitting uninterruptedly a master code to each of said plurality of user terminals;

each user terminal further comprising master code acquisition and tracking means adapted to acquire the master code from the master control station and track same for producing a user code control signal, user code generator means responsive to said user code control signal for generating a user code to be used in achieving the signal demodulation, voice activated means adapted to be responsive to the user voice for activating the carrier to be used in achieving the signal modulation for transmission, said voice activated carrier being thereby interrupted during the pauses in a message, means adapted to produce a synchronization signal for transmission to the master control station when a pause has a duration longer than a predetermined time, said synchronization signal having a duration which should allow the master control station to be locked for signal demodulation, code tracking means in the master control station adapted to be responsive to said synchronization signal for locking the master control station to allow further signal demodulation.

10. A system according to claim 9, wherein each user terminal further comprises processor means adapted to produce said synchronization signal.

11. A system according to claim 9, wherein the master control station further comprises a central processor unit adapted to manage the distribution of the user codes between the different user terminals and to control the transmission of the master code to the said plurality of user terminals.

12. A system according to claim 10, wherein the master control station further comprises a central processor unit adapted to manage the distribution of the user codes between the different user terminals and to control the transmission of the master code to the said plurality of user terminals.

13. A system according to claim 9, wherein each user terminal further comprises voice processor means adapted to compress the user voice and sub-divide it into two data streams in accordance with the hierarchical method.

14. A system according to claim 10, wherein each user terminal further comprises voice processor means adapted to compress the user voice and sub-divide it into two data streams in accordance with the hierarchical method.

* * * * *

UNITED STATES PATENT AND TRADEMARK OFFICE
CERTIFICATE OF CORRECTION

PATENT NO. : 5,327,467
DATED : July 5, 1994
INVENTOR(S) : RICCARDO DE GAUDENZI, ET AL.

It is certified that error appears in the above-identified patent and that said Letters Patent is hereby corrected as shown below:

COLUMN 1

Line 38, "neither suggests" should read --not suggest--.
Line 48, "With" should read --with--.

COLUMN 2

Line 32, "FIGS. 4A-4B" should read --FIGS. 4A-4G--.
Line 49, "is" should read --are--.
Line 51, "an" should read --and--.

COLUMN 3

Line 23, "tile" should read --the--.
Line 62, "substitute" should be deleted.

COLUMN 4

Line 54, "dedi-" should read --a dedi- --.
Line 55, "a" should be deleted.

COLUMN 5

Line 47, "phase" should read --phase ACQUIS--.
Line 48, "acquisition" should be deleted.
Line 53, "accepted. And" should read --accepted and--.
Line 56, close up right margin.
Line 57, close up left margin.
Line 59, "(diagram E). The" should read --(diagram E). ¶ At the end of this preliminary message exchange, the--.
Line 66, "if" should read --If--.

UNITED STATES PATENT AND TRADEMARK OFFICE
CERTIFICATE OF CORRECTION

PATENT NO. : 5,327,467
DATED : July 5, 1994
INVENTOR(S) : RICCARDO DE GAUDENZI, ET AL.

It is certified that error appears in the above-identified patent and that said Letters Patent is hereby corrected as shown below:

COLUMN 6

Line 6, "C)," should read --C);--.
Line 16, "prescriber" should read --prescribed--.
Line 38, "(CMDA)" should read --(CDMA)--.
Line 45, "processing" should read --process--.
Line 55, "form" should read --from--.

Signed and Sealed this

Twenty-first Day of March, 1995

Attest:

BRUCE LEHMAN

Attesting Officer

Commissioner of Patents and Trademarks